(12) United States Patent
Minaz et al.

(10) Patent No.: US 11,840,974 B2
(45) Date of Patent: Dec. 12, 2023

(54) INTELLIGENT MASS AIR FLOW (MAF) PREDICTION SYSTEM WITH NEURAL NETWORK

(71) Applicant: International Engine Intellectual Property Company, LLC, Lisle, IL (US)

(72) Inventors: Askin Minaz, Aurora, IL (US); Ravi Rayala, Aurora, IL (US); Jungme Park, Oxford, MI (US); Rahul Rajampeta Rahul Rajampeta, Naperville, IL (US); Manoj Vemuri, Flint, MI (US); Sriram Jayachandran Raguraman, Flint, MI (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 175 days.

(21) Appl. No.: 17/245,484

(22) Filed: Apr. 30, 2021

(65) Prior Publication Data

US 2022/0349358 A1    Nov. 3, 2022

(51) Int. Cl.
*F02D 41/18* (2006.01)
*G06N 3/08* (2023.01)
*F02D 41/14* (2006.01)

(52) U.S. Cl.
CPC ....... *F02D 41/182* (2013.01); *F02D 41/1405* (2013.01); *F02D 41/187* (2013.01); *G06N 3/08* (2013.01)

(58) Field of Classification Search
CPC .. F02D 41/1405; F02D 41/182; F02D 41/187; G06N 3/08
See application file for complete search history.

(56) References Cited

U.S. PATENT DOCUMENTS 7,093,588 B2 * 8/2006 Edwards ............. F02D 41/2422
123/525
7,299,123 B2 * 11/2007 Taglialatela-Scafati .....................
F02D 41/2477
123/486

(Continued)

FOREIGN PATENT DOCUMENTS

AT           522649 A1 * 12/2020 ......... F02D 41/1405
CN      112067998 A  * 12/2020
(Continued)

*Primary Examiner* — Phutthiwat Wongwian
*Assistant Examiner* — Mark L. Greene
(74) *Attorney, Agent, or Firm* — Mark C. Bach; Umang Khanna

(57) ABSTRACT

The Method and Apparatus of Predicting MAF Sensor Information includes training multiple candidate Artificial Neural Network (ANN) architectures using training data, and then selecting an ANN architecture from the candidates using an automated ANN architecture selection algorithm and testing data. An intelligent engine intake MAF prediction or estimation system using the selected ANN architecture then provides an engine intake Mass Air Flow (MAF) output variable, which is used along with the output of a hot-wire type engine intake MAF sensor. The system is deployed into the engine controller. The training and testing sets of data include input variables from engine sensors and/or actuators that relate to engine intake MAF, and may be acquired by testing a target engine. Selecting the optimal ANN architecture may be based on Root Mean Squared Error (RMSE) analysis using the automated ANN architecture algorithm and the training set of data.

16 Claims, 9 Drawing Sheets

(56) References Cited

U.S. PATENT DOCUMENTS

2021/0003088 A1\* 1/2021 Chen .................. F02B 9/04
2022/0405579 A1\* 12/2022 Yu .................... G06N 3/084

FOREIGN PATENT DOCUMENTS

| DE | 19840010 A1 | \* | 3/1999 | ............. F02B 77/08 |
| DE | 19741973 C1 | \* | 4/1999 | ............. F01N 9/002 |
| KR | 20130043288 A | \* | 4/2013 | ......... F02D 41/0002 |
| WO | WO-2021202528 A1 | \* | 10/2021 | ........... G06N 3/0454 |

\* cited by examiner

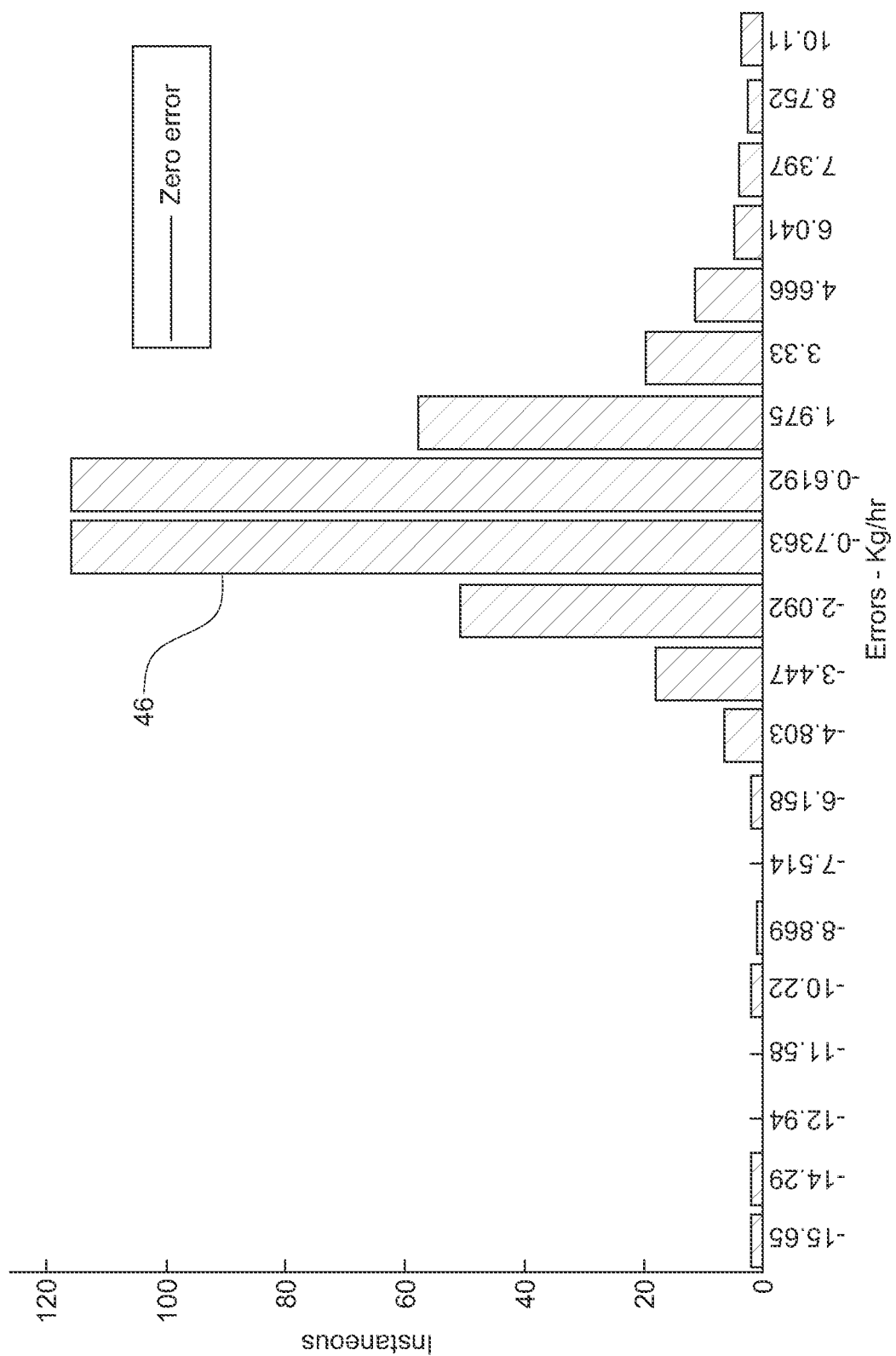

INTELLIGENT MASS AIR FLOW (MAF) PREDICTION SYSTEM WITH NEURAL NETWORK

BACKGROUND

This disclosure relates to engines, and in particular to engines for commercial ground vehicles, in which an Artificial Neural Network (ANN) connected to engine sensors and actuators is used to intelligently predict engine intake Mass Air Flow (MAF) sensor information, and to adjust MAF sensor readings in engine steady state conditions.

Related Art

Air quality around the world is deteriorating because of greenhouse gas and other harmful emissions from various sources. Among these sources, the transportation sector plays a pivotal role. In particular, vehicles equipped with diesel engines, such as straight trucks, highway tractors, busses, recreational vehicles, fire trucks, agricultural vehicles, locomotives and other rail vehicles, and ships, contribute to net greenhouse gas and other harmful emissions. Generally, diesel engines are extensively used in commercial and heavy duty vehicles, rather than gasoline or other Otto-cycle engines, because of their greater torque, ruggedness, and higher fuel efficiencies. However, diesel engines have certain limitations such as lower specific power, higher Nitrous Oxides (NOX) emissions, and higher Particulate Matter (PM) emissions. Increasingly strict emission laws and customer demands for reduced fuel consumption has led to the development of various technologies such as Exhaust Gas Recirculation (EGR) and Variable Geometry Turbochargers (VGT) in order to meet these demands. VGTs are used to more controllably increase specific engine power through selectively boosting the pressure of intake air. EGR, on the other hand, reduces NOX emissions, but sometimes at the expense of engine efficiency. Furthermore, if the EGR, rate is high, the result may be an increase in PM emissions.

The manufacture and use of cleaner combustion engines, including both diesel engines and Otto-cycle engines, has thus become a common goal for automotive and heavy vehicle researchers and Original Equipment Manufacturers (OEMs). With regards to greenhouse gas and other harmful exhaust emissions and fuel control, Mass Air Flow (MAF) of engine intake air plays a crucial role. Moreover, MAF of engine intake air is one of the major parameters that effects the performance of an engine. MAF sensor information is therefore a very critical part of engine emissions and performance control. Furthermore, when EGR and VGT systems are used together, measuring and controlling MAF of engine intake air becomes even more critical and effects the performance of the engine greatly. Therefore, it is very important for an engine controller such as an Engine Control Module (ECM) or Engine Control Unit (ECU) to receive accurate MAF of engine intake air reading from the MAF sensor. It is to be understood that any reference to an engine controller contained herein refers to any device or combination of devices for controlling at least a part of the operation of an engine, whether connected to the engine directly or indirectly.

Current engine intake MAF measurement methods are based on various types of MAF sensors, including vane meter sensors, hot film sensors, and hot wire sensors, Among these, hot wire sensors are most commonly used because of faster response times, greater accuracy, and a lack of moving parts leading to greater durability. Hot wire sensors work on the principle of hot wire anemometry, wherein a fine wire is electrically heated to a temperature above ambient, so that air flowing past the wire cools the wire.[1] The electrical resistance of the wire is dependent upon the temperature of the metal, so that a relationship can be obtained between the resistance of the wire and the airflow velocity. Thereby, the MAF sensor responds to the amount of air flowing through a chamber containing the sensor, and is intended to be insensitive to the density of the air.

[1] Anemometers. 19 Oct. 2020. Retrieved 24 Nov. 2020. https://en.wikipedia.org/wiki/Anemometer#Hot-wire_anemometers In addition to providing adequate control of EGR rate in order to maintain maximum power efficiency while minimizing exhaust emission requirements, the MAF sensor also plays a pivotal role in maintaining the Air-Fuel (A/F) ratio, which is another important quantity that greatly affects exhaust emissions. In this application, the ECM or ECU receives signals from the MAF sensor indicative of the engine intake MAF being drawn into the engine cylinders. The ECM or ECU can then direct the fuel injector assembly to deliver a particular quantity of fuel into the cylinders to maintain predetermined A/F ratios. These ratios can be based upon software algorithms stored within and executed by the ECM or ECU, or upon a table look-up sequence, also executed by and stored within the ECM or ECU.

However, the output of a hot wire anemometer MAF sensor is susceptible to problems in maintaining accuracy in output readings and/or drift from actual MAF values over the lifetime of the sensor. Specifically, the sensor may become less sensitive over time due to various reasons such as the high non-linearity of the VGT system, changes to the air intake assembly, contamination of the sensor wire, simple aging, and etcetera.[2] This sensor drift problem can potentially cause an engine to have difficulty meeting exhaust emission requirements and On Board Diagnostics (OBD) regulatory requirements over time. To compensate for the sensor drifting issue, MAF sensors can be recalibrated with the engine off-line. Calibration of a MAF sensor is usually dependent upon specific details of a particular engine. In most cases, therefore, the MAF sensor requires an installation-specific calibration, which means that the technician performing the calibration must know engine specific data in order to accurately recalibrate the MAF sensor. As a result, MAF sensor recalibration is time consuming and may need to be performed multiple times over the lifetime of the sensor.[3,4,5,6,7,8]

[2] Cummins Inc., Columbus, IN (2012). US20130131955A1. Ser. No. 13/646, 891

[3] Wu, Bin, Zoran Filipi, Dennis N. Assanis, Denise M, Kramer, Gregory L, Ohl, Michael J. Prucka, and Eugene Divalentin, "Using Artificial Neural Networks for Representing the Air Flow Rate through a 2.4 Liter VVT Engine." SAE Technical Paper Series, Oct. 25, 2004. https://doi.org/10,4271/2004-01-3054.

[4] Desantes, J. m., J. Galindo, C. Guardiola, and V, Dolz. "Air Mass Flow Estimation in Turbocharged Diesel Engines from in-Cylinder Pressure Measurement." Experimental Thermal and Fluid Science 34, no. 1 (2010): 37-47. https://doi.org/10.1016/j.expthermflusci.2009.08.009.

[5] Barbarisi, Osvaldo, di Gaeta, Alessandro & Glielmo, Luigi & Santini, Stefania. "An Extended Kalman Observer for the In-Cylinder Air Mass Flow Estimation," 2002,

[6] Polóni, Tomáš, and Rohal'-Ilkiv, Boris," Mass Flow Estimation with Model Bias Correction for a Turbocharged Diesel Engine." Control Engineering Practice, 2013, 23(1):22-31

[7] Deng, Jlamei, Stobart, Richard, and Maass Basti, "The Applications of Artificial Neural Networks to Engines." Artificial Neural Networks-Industrial and Control Engineering Applications, April 2011. https://doi.org/10.5772/15783,

[8] Uzun, Abdullah, "Air Mass Flow Estimation of Diesel Engines Using Neural Network." Fuel 117 (2014): 833-38. https://doi.org/10.1016/j.fuel.2013,09.078.

Another known method for compensating for MAF sensor drift is a MAF sensor learning service test. This test may be performed periodically or when the MAF sensor is replaced.

The test helps to readjust the MAF sensor reading by back-calculating the adjustment coefficients based on the MAF sensor hardware specifications. These adjustment coefficients determined during the MAF sensor learning service test are then used by the engine controller until another MAF sensor learning service test is performed. However, this test is also time consuming and it also requires the engine to operate under specific conditions to successfully complete the service test. The need for the engine to operate under specific conditions during the MAF sensor learning service test, in turn, causes downtime to vehicle operators and presents challenges to service organizations. In addition, MAE estimation methodologies require complex software design algorithms and/or a lot of calibration development effort.

In order to overcome these problems, research is ongoing in the art. Kramer et al. have conducted an experimental investigation on a 2.4 liter Variable Valve Timing (VVT) engine equipped with independent intake and exhaust camshaft phasers, in order to model the intake air MAF using Artificial Neural Networks (ANN's). A back propagation algorithm is used by Kramer et al. for training. Kramer et al.'s test data as well as in-vehicle implementation have showed that ANN's are capable of predicting engine intake MAF accurately.[9] Oh et al, have done a practical study on neuro-adaptive non-linear control of a diesel engine by tracking engine intake MAF and controlling EGR valve lift, using neural networks for engine intake MAF calculation and control of EGR valve lift. These tests were conducted on a 2.2 liter common-rail diesel engine, and the results showed that the proposed control system effectively tracks target engine air MAF and reduces EGR valve movement to a great extent.[10]

[9] Wu, Bin, Zoran Filipi, Dennis N. Assanis, Denise M. Kramer, Gregory L. Ohl, Michael J. Prucka, and Eugene Divalentin. "Using Artificial Neural Networks for Representing the Air Flow Rate through a 2.4 Liter VVT Engine." SAE Technical Paper Series, Oct. 25, 2004. https://doi.org/10.4271/2004-01-3054.

[10] Oh, Byounggul, Minkwang Lee, Yeongseop Park, Jongseob Won, and Myoungho Sunwoo. "Mass Air Flow Control of Common-Rail Diesel Engines Using an Artificial Neural Network." Proceedings of the Institution of Mechanical Engineers, Part D: Journal of Automobile Engineering 227, no. 3 (April 2012): 299-310. https://doi.org/10.1177/0954407012457497.

Uzun conducted an investigative study on engine intake MAF of a turbocharged diesel engine with and without intercooler, and was able to determine engine intake MAF with and without intercooler at various operating conditions of the engine with good accuracy through the use of neural networks. Uzun used Scaled Conjugate Gradient Descent (SCG) for learning.[11] Taglialatela-Scafati and Ferdinando investigated an alternate method of using neural networks for sensing engine intake MAF in the cylinder of an internal combustion engine. Their experimental results performed in both steady state and in transient conditions using a trained neural network model showed better performance in steady state than in transients. This result may be due to manifold dynamics, which plays a crucial role.[12] Kerkeni et al. proposed a method to estimate in-cylinder MAF of a gasoline engine using a Takagi-Sugeno fuzzy inference system which is a non-linear discrete observer. Their results showed relative error up to 10%.[13]

[11] Uzun, Abdullah. "Air Mass Flow Estimation of Diesel Engines Using Neural Network." Fuel 117 (2014): 833-38. https://doi.org/10.1016/j.fuel.2013.09.078.
[12] Taglialatela-Scafati, Ferdinando, Cesario, Nicola and Cassese, Pasquale. "Method and device for estimating the inlet air flow in a combustion chamber of a cylinder of an internal combustion engine". EP170535381, August, 2012.
[13] Kerkeni, H., J. Lauber, and T. m. Guerra, "Estimation of individual in-Cylinder Air Mass Flow via Periodic Observer in Takagi-Sugeno Form," 2010 IEEE Vehicle Power and Propulsion Conference, 2010.

Barbasi et al. conducted a practical investigative study on the application of an extended Kalman filter to a gasoline engine with three way catalytic converter. The extended Kalman filter observed the engine intake MAF sensor and the intake manifold absolute pressure, and then estimated the engine intake MAF.[14] Desantes et al. determined MAF through an in-cylinder pressure sensor in a diesel engine using the $\Delta p$-method, and found that their method was slightly more precise than the standard volumetric efficiency method. However, the in-cylinder sensor is costly.[15] Hockerdal et al. investigated the MAF of a diesel engine and developed various estimators. However, Hockerdal et al. required a good amount of MAF sensor data during continuous monitoring.[16] Jiamei et al. did a practical study of the applications of artificial neural networks to engines, and found that neural networks provide a broad range of functions and can be applied to the field of Engine Systems in various aspects such as modelling of controller design, on-board testing, and diagnostics.[17]

[14] Barbarisi, Osvaldo, di Gaeta, Alessandro & Glielmo, Luigi & Santini, Stefania. "An Extended Kalman Observer for the In-Cylinder Air Mass Flow Estimation." 2002.
[15] Desantes, J. m., J. Galindo, C. Guardiola, and V. Dolz. "Air Mass Flow Estimation in Turbocharged Diesel Engines from in-Cylinder Pressure Measurement." Experimental Thermal and Fluid Science 34, no. 1 (2010): 37-47. https://doi.org/10.1016/j.expthermflusci.2009.08,009.
[16] Höckerdal, Erik, Lars Eriksson, and Erik Frisk. "Air Mass-Flow Measurement and Estimation in Diesel Engines Equipped with OR and VGT," SAE International Journal of Passenger Cars—Electronic and Electrical Systems 1, no. 1 (2008): 393-402. https://doi.org/10.4271/2008-01-0992.
[17] Deng, Jiamei, Stobart, Richard, and Maass Basti, "The Applications of Artificial Neural Networks to Engines." Artificial Neural Networks—Industrial and Control Engineering Applications, April 2011. https://doi.org/10.5772/15783.

Accordingly, there is an unmet need for an arrangement and method for intelligently predicting engine intake MAF sensor information, and adjusting MAF sensor readings in engine steady state conditions.

SUMMARY

According to one embodiment of the Intelligent Mass Air Flow (MAF) Prediction System with Neural Network, an Arrangement includes an engine having an engine controller and an engine intake Mass Air Flow (MAF) sensor, An intelligent engine intake MAF prediction system is configured to provide an engine intake MAF output variable instead of and/or in conjunction with the engine intake MAF sensor. The intelligent engine intake MAF prediction system includes an Artificial Neural Network (ANN) deployed into the engine controller and having an ANN architecture selected from multiple candidate ANN architectures. Each of the multiple candidate ANN architectures are trained using a training set of data. The selected ANN architecture is selected by way of an automated ANN architecture selection algorithm using a testing set of data.

According to another embodiment of the Intelligent MAF Prediction System with Neural Network, a Method includes several steps. The first step is providing an engine with an engine controller and an engine intake MAF sensor. The second step is training multiple candidate Artificial Neural Network (ANN) architectures using a training set of data. The third step is selecting an ANN architecture from the multiple candidate ANN architectures by way of an automated ANN architecture selection algorithm using a testing set of data. The fourth step is configuring an intelligent engine intake MAF prediction system to provide an engine intake MAF output variable instead of and/or in conjunction with the engine intake MAF sensor using the selected ANN architecture. The fifth step is deploying the intelligent engine intake MAF prediction system including the selected. ANN architecture into the engine controller.

DESCRIPTION OF THE DRAWINGS

FIG. 4 is a graph showing training error distribution of an embodiment of the Intelligent MAF Prediction System with Neural Network of the present disclosure, as described herein;

DETAILED DESCRIPTION

Figure 1:
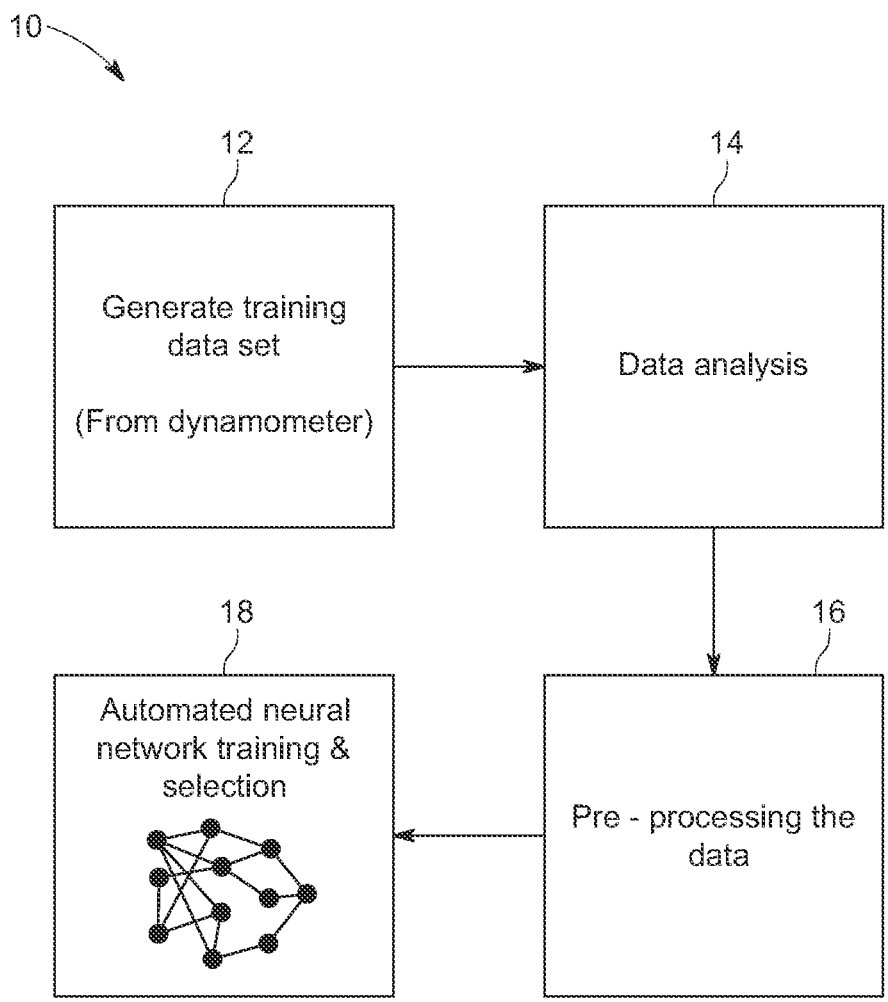
FIG. 1 is a graphic illustration of an embodiment of the Intelligent MAF Prediction System with Neural Network of the present disclosure, as described herein.

Embodiments described herein relate to an Intelligent MAF Prediction System with Neural Network, which may be embodied as both a method and an arrangement. The method and arrangement may be applied to various types of stationary applications, marine applications, passenger vehicles, commercial vehicles, and recreational vehicles, such as highway or semi-tractors, straight trucks, busses, fire trucks, agricultural vehicles, motorhomes, rail travelling vehicles, and etcetera. It is further contemplated that embodiments of the intelligent MAF Prediction System with Neural Network may be applied to engines configured for various fuels, such as gasoline, diesel, propane, natural gas, and hydrogen, as non-limiting examples. The several embodiments of the Intelligent MAF Prediction System with Neural Network presented herein are employed on vehicles utilizing the Diesel cycle, but this is not to be construed as limiting the scope of the method and arrangement, which may be applied to engines of differing construction.

The method and arrangement of the present disclosure includes an intelligent engine intake MAF prediction system that is used to estimate engine intake MAF of heavy duty diesel engines having VGT, EGR, and/or CAC, using machine learning technology. Specifically, the method and arrangement of the present disclosure provides heavy and medium duty diesel engines with the capacity to intelligently predict or estimate engine intake MAF sensor information and to adjust the engine intake MAF sensor values over time and over the entire operating range of the engine. This is accomplished by way of Artificial Neural Network (ANN) Machine Learning methodology, in order to keep the engine intake MAF reading accurate. The ANN Machine Learning methodology eliminates the process of complex software design development and lengthy calibration development. The method and arrangement of the present disclosure thereby mitigates the engine intake MAF sensor drifting problem and eventually avoids the need for manual off-line calibration of the MAF sensor.

Artificial Neural Networks (ANNs) have been widely used in a variety of engineering research and further they are known to learn underlying highly non-linear relationships. An ANN is a network or circuit composed of artificial neurons or nodes that uses a mathematical or computational model for information processing based on a connectionistic approach to computation. In most cases an ANN is an adaptive system that changes its structure based on external or internal information that flows through the network. The connections of the neurons are modeled as weights. A positive weight reflects an excitatory connection, while negative values mean inhibitory connections. All inputs are modified by a weight and summed. This activity may be referred to as a linear combination. Finally, an activation function controls the amplitude of the output. For example, an acceptable range of output is usually between 0 and 1, or it could be −1 and 1. These artificial networks may be used for predictive modeling, adaptive control, and applications where they can be trained via a dataset. Self-learning resulting from experience then occurs within networks, which can derive conclusions from a complex and seemingly unrelated set of information,[18]

[18] Neural Network. 20 Oct. 2020. Retrieved 30 Nov. 2020. https://en.wikipedia.org/wiki/Neural_Network Neural networks function as non-linear statistical data modeling or decision making tools that can be used to model complex relationships between inputs and outputs or to find patterns in data. ANN models can be used to infer a function from observations and also to use the function. Learning in neural networks is particularly useful in applications where the complexity of the data or task makes the design of such functions by hand impractical.[19] The Intelligent MAE Prediction System with Neural Network of the present disclosure includes an intelligent engine intake MAF estimation system which utilizes an ANN machine learning methodology, for non-limiting example with a Navistar 12.42 liter Heavy Duty Diesel Engine equipped with VGT and EGR.

[19] Id.

As shown in FIG. 1, the Intelligent MAF Prediction System with Neural Network 10 presented herein includes four major elements. The first step 12 in the method is to conduct certain tests on the target engine and collect the data. The second step 14 in the method is to analyze the acquired data and select the input variables that influence or relate to engine intake MAF. The third step 16 is preprocessing the data, which involves normalizing and splitting the data into training and testing sets. The fourth step 18 is training and quantitative assessment of various candidate ANN architectures and finding the best ANN architecture. For this purpose, the Matlab® Neural Network toolbox and its functions may be used. MATLAB® is available from MathWorks® located at 1 Apple Hill Drive Natick, MA 01760. The optimal ANN architecture is then developed by an automated ANN architecture selection algorithm. Each step in the method and arrangement is explained hereinafter.

In one non-limiting exemplary embodiment of the Intelligent MAF Prediction System with Neural Network 10, a target engine for modelling the intelligent engine intake MAF prediction or estimation system is a Navistar A26 12.42 liter, six-cylinder, four-stroke, Diesel Engine with Variable Geometry Turbocharger (VGT), Exhaust Gas Recirculation (EGR), and Charge Air Cooler (CAC). The specifications of this engine are shown in the Table 1.

TABLE 1

Engine Specifications

| Make & Model | Navistar International A26 |
|---|---|
| Engine Type | Diesel |
| Stroke | 4 |
| Configuration | In-Line 6 Cylinder |
| Bore | 126 mm |
| Piston Stroke | 166 mm |
| Compression Ratio | 18.5:1 |
| Maximum Power | 500 hp (1700 rpm) |
| Maximum Speed | 2200 rpm |
| Idle Speed | 590 rpm |
| Engine Displacement | 12.42 L |
| Engine Weight | 1043 Kg |
| Fuel Injection Type | High Pressure Common Rail |

Generating Training Data Set

Under the first step 12 of the Intelligent MAF Prediction System with Neural Network 10, the data used to develop the intelligent engine intake MAF prediction or estimation system may be collected from an engine dynamometer under various operation conditions of the previously identified target engine. The intelligent engine intake MAF prediction or estimation system may then be trained and the optimal architecture may be developed based on the ANN selection algorithm. Using this method, the optimal ANN architecture may be able to predict engine intake MAF with a mean testing prediction accuracy of 99.41%. This trained ANN may then be deployed into an engine controller, for non-limiting example into an Engine Control Unit (ECU) or an Engine Control Module (ECM), as a Simulink® block, and may then be used to predict the engine intake MAF instead of, or in conjunction with, the engine intake MAF sensor.

When using machine learning algorithms, a large amount of data is required to train the computer to learn a given task. The data set used to develop the ANN of the intelligent engine air intake MAF prediction or estimation system of the present intelligent MAF Prediction System with Neural Network 10 may be generated by conducting various tests on the target engine using a dynamometer, as noted previously. Each data sample generation experiment may be carried out on a dynamometer test cell under ambient steady state conditions. Along with information from certain engine sensors and actuators, a dynamometer bench measurement of engine intake air may be used as a reference point, or true value, to train the ANN of the intelligent engine air intake MAF prediction system. Similarly, validation and verification may be performed with the target engine dynamometer data.

Generally, ANNs are very effective in interpolating within a range of training data, but they should not be expected to extrapolate beyond that range. The data collection plan of the present Intelligent MAF Prediction System with Neural Network, therefore, may be designed in such a way as to cover the entire normal operating range of the target engine. More specifically, a series of tests may be conducted on the target engine using an eddy current dynamometer test cell, wherein the engine speed (N) and accelerator pedal position is varied systematically over the allowed ranges listed in Table 2 for four different engine intake air temperatures. The four different engine intake air temperatures may include two hot temperatures and two cold temperatures, which may be achieved by heating and cooling the intake air at the intake of the dynamometer arrangement.

TABLE 2

Interval & bounds of the data collection control parameters

| CONTROL PARAMETER | LOWER BOUND | UPPER BOUND | INTERVAL |
|---|---|---|---|
| Engine Speed (rpm) | 600 | 2100 | 100 |
| Accelerator Pedal Position (%) | 3 | 100 | not uniform |
| Engine Intake Air Temperature | | 10, 25, −18, −7 | |

The engine intake temperature may be varied as a target variable, in other words, the engine intake MAF may be expected to be affected by the change in the engine intake temperature. The accelerator pedal position may also be varied, so that the entire operating range of the engine is covered with respect to engine speed and accelerator pedal positions. All respective engine performance and emission parameters may be collected from ECM signals. True mass air flow values may be measured using a laminar flow meter and correlated with the engine air MAF sensor reported values.

Data Analysis

Under the second step 14 of one non-limiting exemplary embodiment of the Intelligent MAF Prediction System with Neural Network 10, the steady state tests conducted for each combination of engine speed and accelerator pedal position with respect to four different engine intake air temperatures, may for example result in a total of 512 combinations of engine parameters. It is understood that a larger or smaller number of target and input variables may be used in embodiments of the Intelligent MAF Prediction System with Neural Network 10, resulting in more or less combinations of engine parameters. The selection of an appropriate set of variables as inputs for the ANN of the intelligent engine air intake MAF prediction or estimation system is therefore an important step, as the performance of the intelligent engine air intake MAF prediction or estimation system is dependent on its input variables. An object of the data analysis step, then, is to select the relevant input variables that influences engine intake MAF.

Fourteen input variables including various engine sensors and actuators may be identified as affecting the engine intake MAF of the target engine, and may be obtained from their respective ECM and/or dynamometer signals from the collected data. Again, it is understood that a larger or smaller number of input variables may be identified in embodiments of the intelligent MAF Prediction System with Neural Network 10 while remaining within the scope of this disclosure. Some of the selected variables of this exemplary embodiment are listed in Table 3 with their ranges as established by the collected data.

TABLE 3

Mass air flow influential parameters

| Name of the Variable | Units | Min | Max |
|---|---|---|---|
| Exhaust Manifold Absolute Pressure | hPa | 1178.3 | 4079.3 |
| Intake Manifold Absolute Pressure | hPa | 1019.1 | 3673.1 |
| Fuel Injected | mg/cy-stroke | 10.8 | 261.9 |
| Speed | rpm | 599.5 | 2100.3 |
| Engine Exhaust Gas Temperature | ° C. | 105.8 | 631 |
| Brake Torque | lb-ft | 4.4 | 1788.6 |
| Accelerator Pedal Position | % | 3.9 | 100 |
| VGT Actuator Position | % | 19.9 | 87.4 |
| EGR Valve Position | % | 0 | 59.9 |
| Engine Coolant Temperature | ° C. | 3.55 | 62.83 |
| Barometric Pressure | hPa | 975.4 | 1001.9 |
| Ambient Air Temperature | ° C. | 21 | 28.3 |
| Engine Intake Air Temperature | ° C. | −19.15 | 26.22 |

Further, in order to check whether there are any redundant variables in the selected input variables, a Pearson correlation test may be performed to check the correlation between each variable and the engine intake MAF, The Pearson correlation coefficient is a statistic that measures linear correlation between two variables X and Y. It has a value between +1 and −1, with a value of +1 being a total positive linear correlation, a value of 0 being no linear correlation, and a value of −1 being a total negative linear correlation.[20] Even though certain variables may be non-linearly related to the engine intake MAF, the Pearson correlation test may show that each has some sort of correlation with the engine intake MAF.

[20] Pearson correlation coefficient. 28 Nov. 2020. Retrieved 1 Dec. 2020. https://en.wikipedia.org/wiki/Pearson_correlation_coefficient

Pre-Processing the Data

Under the third step 16 of the present exemplary embodiment of the Intelligent MAF Prediction System with Neural Network 10, the data may be pre-processed as part of the process in order to assist the ANN in learning the data patterns. Since the intelligent engine intake MAF prediction system may be developed with multiple input variables, the input variables might not be fed into the ANN in raw form. Specifically, the range of values of each input variable to be optimized may be initially broad, and may be optimized. For example, the data range of two input variables, Exhaust Manifold Absolute Pressure and Ambient Temperature of the present exemplary embodiment were in the range of 1178.3 hPa to L1079.3 hPa, and 21° C. to 28.3° C., respectively. Since the data range of input variable values as raw data may vary widely, the objective functions in the machine learning algorithms may not work properly without normalization. In the data normalization pre-processing step of the Intelligent MAT Prediction System with Neural Network 10, therefore, all of the input and output variables may be brought into same range of [−1, −1] to [1, 1], for example [0, 1] or [−1, 1]. In the Intelligent MAF Prediction System with Neural Network 10, the data may be normalized using the following equation:

$$norm_{x_i} = \frac{x_i - \min(x_i)}{\max(x_i) - \min(x_i)}, i = 1, \ldots, k$$

where $normx_i$ is a normalized vector for the input feature, $x_i$, $x_i$ is the $i^{th}$ input feature vector, $\max(x_i)$ is the maximum in $x_i$, $\min(x_i)$ is the minimum in $x_i$, and k is the total number of input variables in the intelligent engine intake MAF prediction or estimation system.

Automated Neural Network Selection Algorithm

As noted previously, the fourth step 18 of the Intelligent MAF Prediction System with Neural Network 10 is training various neural network architectures and finding the best architecture, the optimal neural network architecture being developed by an automated neural-network architecture selection algorithm. Generally, to create an ANN, certain properties of the network may be considered, such as the input variables, the number of hidden layers, the number of hidden neurons, the number of neurons in the output layer, the learning algorithm, and the activation function. In the present exemplary embodiment of the intelligent engine intake MAF prediction or estimation system of the intelligent MAF Prediction System with Neural Network 10, fourteen input variables were selected and the output variable is the engine intake MAF, although it is again contemplated that more or less input variables may be utilized. For network optimization, Levenberg-Marquardt algorithm may be used for training and the Tangent Sigmoid may be used as a transfer activation function for the hidden layer output. The ANN may utilize a gradient descent (also known as backpropagation) algorithm to learn its weights and biases while looking for the minimum error function.

The Levenberg-Marquardt algorithm, also known as the damped least-squares method, is generally used to solve non-linear least squares problems. Specifically, the Levenberg-Marquardt algorithm is used in software applications for solving generic curve-fitting problems. The Levenberg-Marquardt algorithm finds only a local minimum, which may not necessarily be the global minimum. The Levenberg-Marquardt algorithm interpolates between the Gauss-Newton algorithm and the method of gradient descent. The Levenberg-Marquardt algorithm is more robust than the Gauss-Newton algorithm, which means that in many cases it finds a solution even if it starts very far off the final minimum.[21]

[21] Levenberg-Marquardt algorithm. 27 Aug. 2020. Retrieved 1 Dec. 2020. https://en.wikipedia.org/wiki/Levenberg—Marquardt_algorithm Generally, when determining the number of neurons in the hidden layers and the number of hidden layers in an ANN, trial and error is used to get the best solution, which is the best architecture with least Root Mean Squared Error (RMSE). In the intelligent engine intake MAF prediction or estimation system of the Intelligent MAF Prediction System with Neural Network 10 of the present disclosure, in order to provide the optimal ANN, an algorithm is used to select the optimal ANN architecture based on RMSE analysis to train a number of ANNs with random numbers of hidden layers and neurons. This automated procedure is depicted in FIG. 2, which is a schematic representation of the automated neural network training and selection algorithm.

Figure 2:
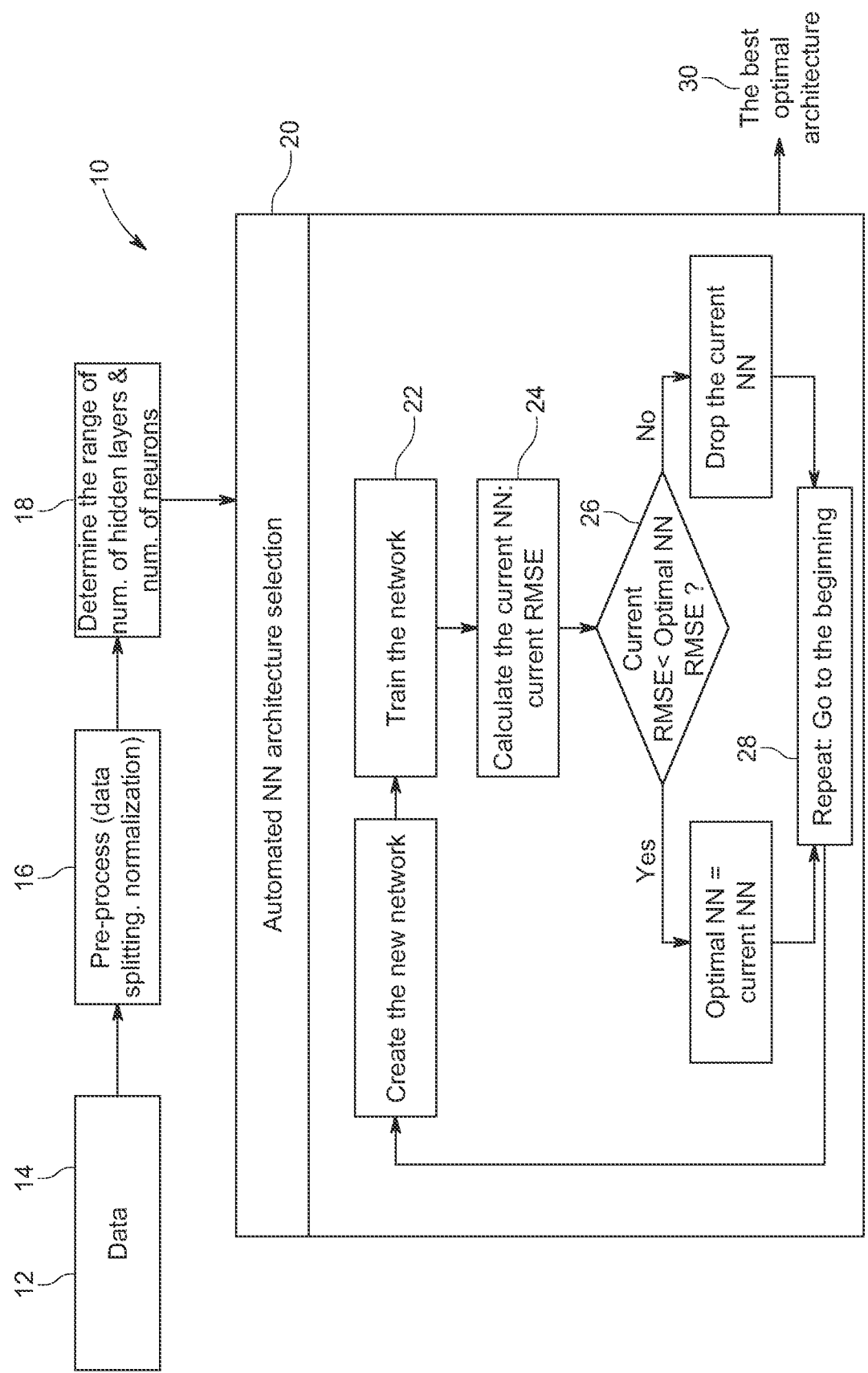
FIG. 2 is a schematic representation of an automated neural network training and selection algorithm of an embodiment of the Intelligent MAF Prediction System with Neural Network of the present disclosure, as described herein.
Figure 3A:
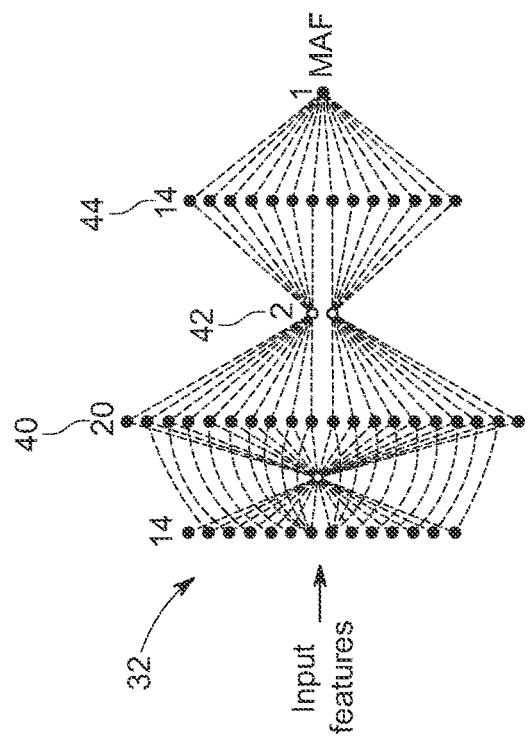
FIGS. 3A, 3B, 3C, and 3D are graphic illustrations of several neural network architectures of embodiments of the intelligent MAF Prediction System with Neural Network of the present disclosure, as described herein.
Figure 3B:
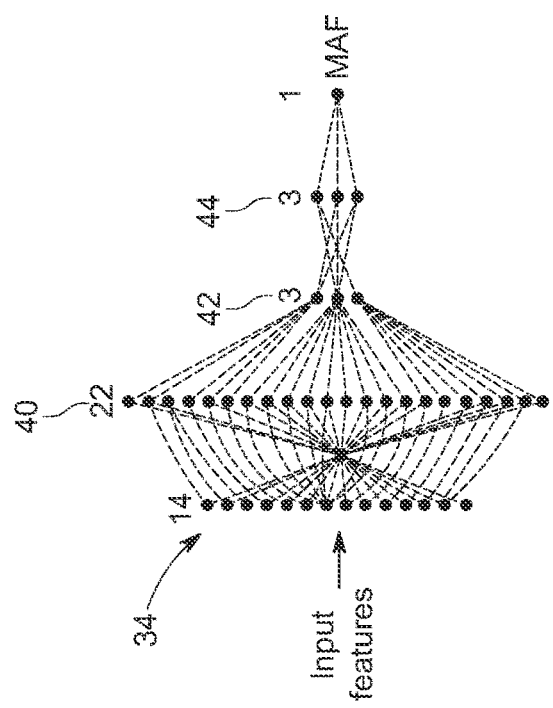
Figure 3C:
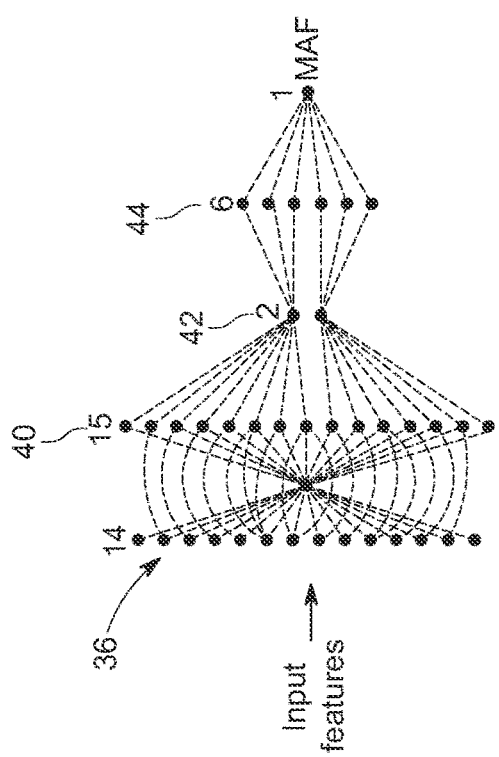
Figure 3D:
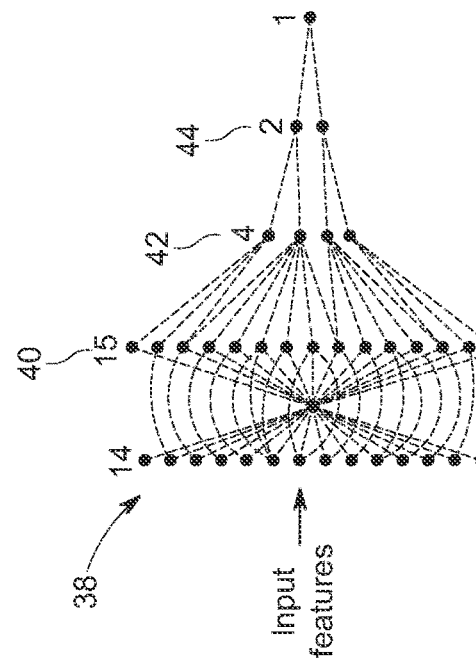

In the Intelligent MAF Prediction System with Neural Network 10 shown in FIG. 2, the tests on the target engine and collection of data therefrom is performed at 12, and the analysis of the acquired data and selection of input variables is performed at 14. Training the various ANN architectures and finding the best ANN architecture starts at 18, wherein the automated ANN architecture development and/or selection algorithm 20 is triggered after pre-processing of the data. From a given range of numbers of hidden layers and hidden neurons, all possible combinations of ANNs may be generated. Next, each of the ANNs from the generated combinations may again be trained with the Levenberg-Marquardt algorithm at 22. For each candidate ANN architecture the performance of the architecture is evaluated at 24 by calculating the Root Mean Square Error (RMSE) using the testing data samples with RMSE being selected as the performance metric.

The RMSE calculated using the current ANN architecture is then compared at 26 with the optimal ANNs' RMSEs thus far. During the first iteration, the initial ANN may be assigned as the optimal network. If during a subsequent iteration, the RMSE of the ANN being evaluated is less than the previously optimal ANN, then the ANN being evaluated is selected as the optimal ANN. If the RMSE of the ANN being evaluated is greater than the previously optimal ANN, then the previously optimal ANN remains the optimal ANN, and the Ann being evaluated is discarded. Accordingly, the best. ANN architecture status is updated. This procedure is repeated at 28 until all the generated ANN combinations are computed. Finally, the optimal ANN with the minimum RMSE, i.e. —having the optimum level of complexity in terms of levels of layers and neurons, is output at 30.

Results

The automated optimal ANN selection algorithm 20 of the intelligent engine air intake MAF prediction or estimation system of the present exemplary embodiment of the Intelligent MAF Prediction System with Neural Network 10 evaluated a total of 14, 896 ANN architecture combinations. Among the 14,896 ANNs the best performance was obtained by four candidate ANN architectures 32, 34, 36, and 38, as presented in FIG. 3. The performances of the best four ANN architectures 32, 34, 36, and 38 shown in FIGS. 3A, 3B, 3C, and 3D are summarized in Table 4. All four ANN architectures have a first hidden layer 40, a second hidden layer 42, and a third hidden layer 44, with the performance of each ANN architecture being more or less the same.

TABLE 4

Training & Testing RMSE of the best architectures

| Network | Num. of Hidden Neurons | | | Training RMSE (Kg/hr) | Testing RMSE (Kg/hr) |
|---|---|---|---|---|---|
| | Layer1 (40) | Layer 2 (42) | Layer 3 (44) | | |
| 1 (32) | 20 | 2 | 14 | 2.743 | 4.827 |
| 2 (34) | 22 | 3 | 3 | 3.083 | 5.970 |
| 3 (36) | 15 | 2 | 6 | 2.674 | 5.361 |
| 4 (38) | 15 | 4 | 2 | 2.978 | 4.865 |

Training Results

To demonstrate the performance of the intelligent engine intake MAF prediction or estimation system of the present exemplary embodiment of the Intelligent MAF Prediction System with Neural Network 10, the first optimal ANN architecture 32 in Table 4 was chosen for consideration. As the performances of the four ANN architectures 32, 34, 36, and 38 are similar, similar results would be expected from the remaining ANN architectures. The first optimal ANN architecture 32 in Table 4 has twenty neurons in the first hidden layer 40, two neurons in the second hidden layer 42, and fourteen neurons in the third hidden layer 44 as presented in FIG. 3A. The training RMSE of the network is 2.743 kg/hr and the training error distribution 46 is shown in the FIG. 4. As shown in FIG. 4, 91% of the training engine intake MAF predictions deviate between ±4 Kg/hr from the true engine intake MAF value. In the remaining 9%, a maximum error of 15 kg/hr is observed in a very few cases wherein the engine is operating at low speeds and lower EGR rates, i.e. —less than 25%. Overall, the training engine intake MAF predictions showed a mean percentage error of 0.25%.

Testing Results

Figure 5:
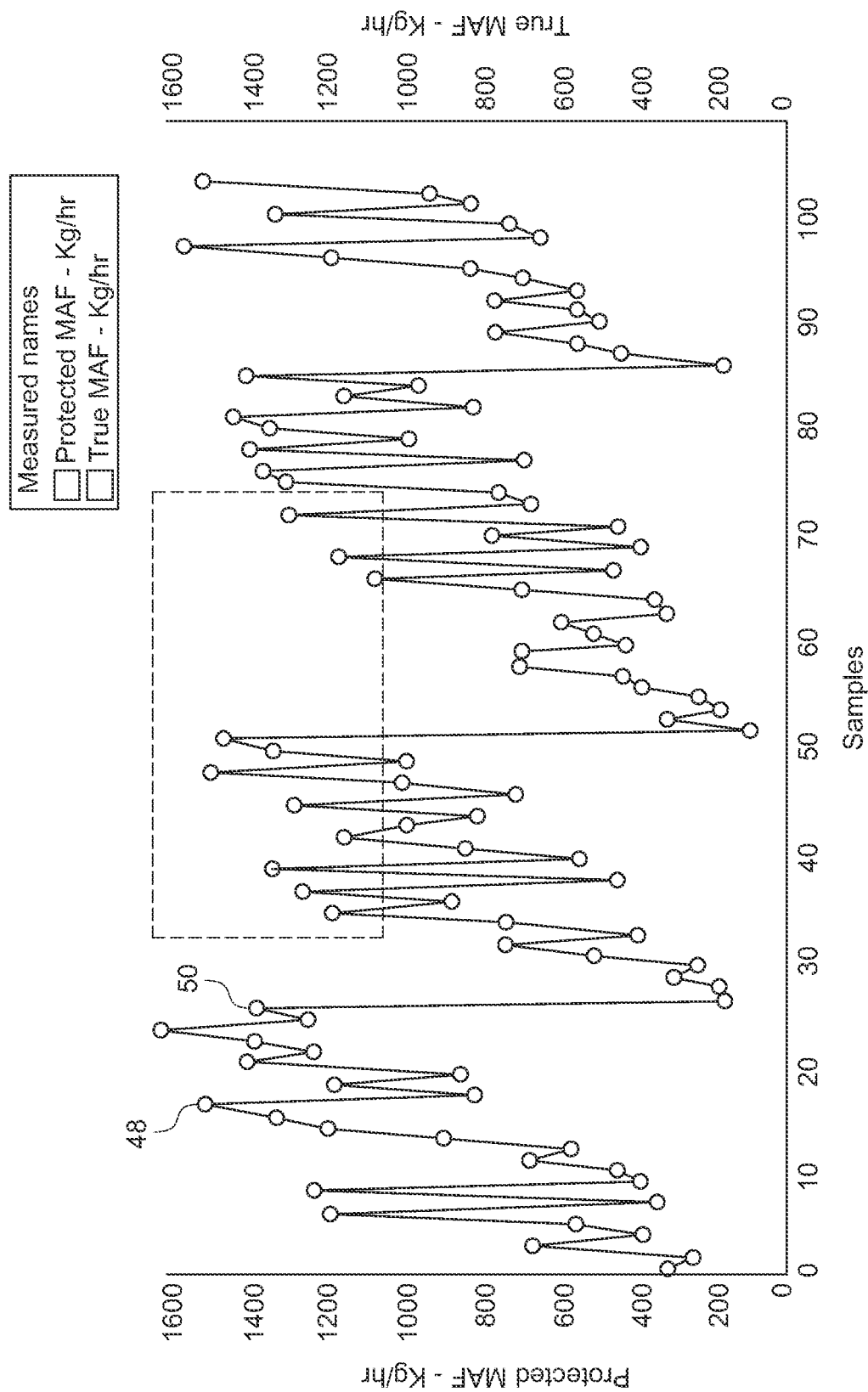
FIG. 5 is a graph of an output of an embodiment of the Intelligent MAF Prediction System with Neural Network of the present disclosure, as described herein.
Figure 6:
FIG. 6 is a graph of an output of an embodiment of the Intelligent MAF Prediction System with Neural Network of the present disclosure, as described herein.

The developed intelligent engine intake MAF prediction or estimation system of the present exemplary embodiment of the intelligent MAF Prediction System with Neural Network 10 was then applied to the data points that were not used for training. The predicted engine intake MAF values 48 from the intelligent engine intake MAF prediction or estimation system are plotted against the actual engine intake MAF values 50 in FIG. 5. A detail view of the predicted engine intake MAF values 48 and the actual engine intake MAF values 50 is shown in FIG. 6. As shown in FIGS. 5 and 6, the developed intelligent engine intake MAF prediction or estimation system predicted engine intake MAF values 48 demonstrate excellent agreement with the actual engine intake MAF values 50.

Figure 7:
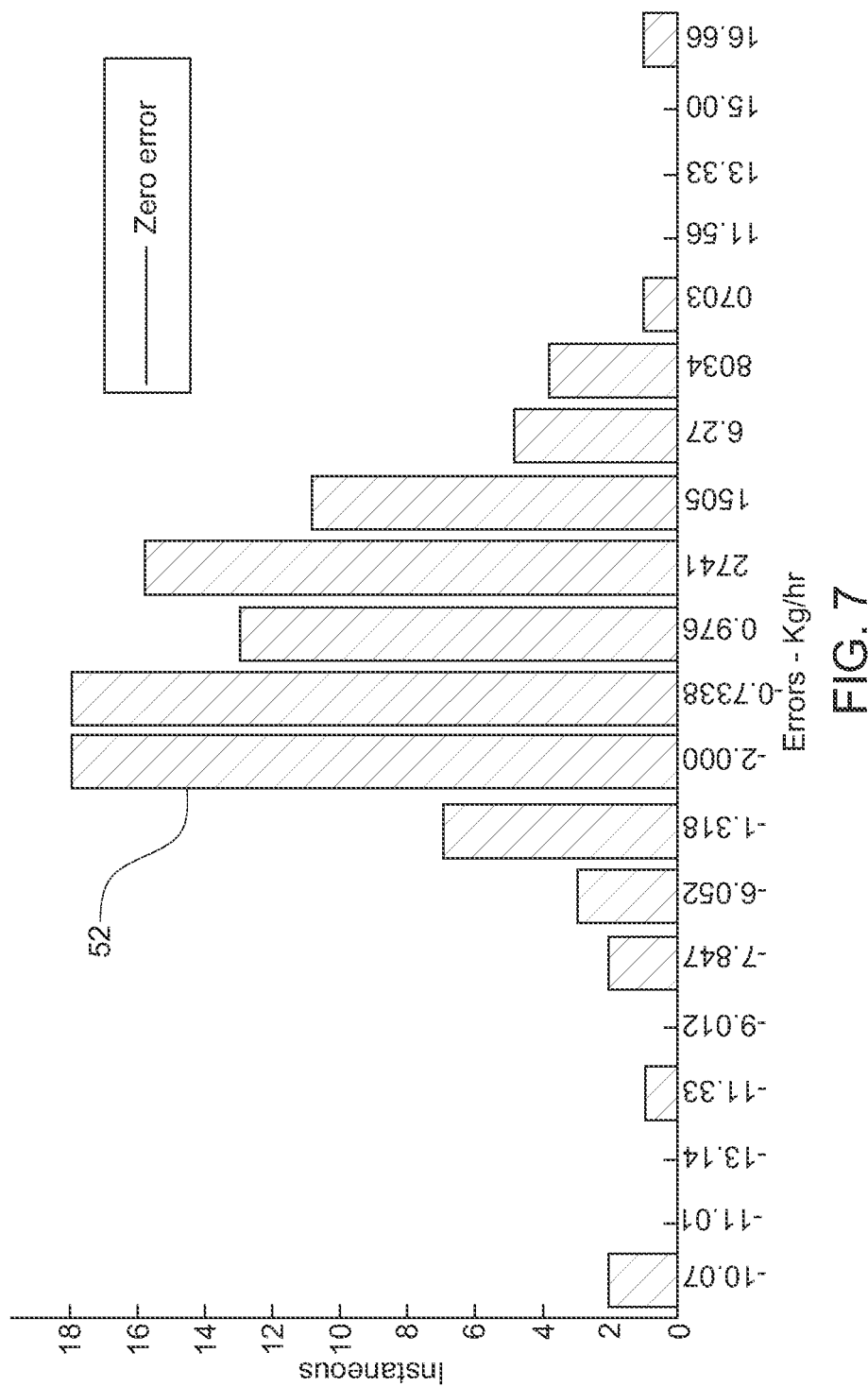
FIG. 7 is a graph showing testing error distribution of an embodiment of the Intelligent MAF Prediction System with Neural Network of the present disclosure, as described herein.

The overall RMSE of the testing cases of the intelligent engine intake MAF prediction or estimation system of the present exemplary embodiment of the intelligent MAF Prediction System with Neural Network 10 is 4.827 Kg/hr. As shown in FIG. 7, the overall error distribution 52 indicates that in testing 94.11% of the engine intake MAF predictions deviate between ±8 Kg/hr from the actual engine intake MAF. More than ±8 Kg/hr error is observed in only a few cases wherein the engine is operating at lower speeds and lower EGR rates. Testing results showed a similar trend as with respect to the training data having a mean percentage error of 0.59%. The training and testing results of the ANN predictions for engine intake MAF, therefore, demonstrate excellent agreement with the actual engine intake MAF, with very minimal error. It follows that the intelligent engine intake MAF prediction or estimation system of the present Intelligent MAF Prediction System with Neural Network 10 can be used to predict the engine intake MAF of the target Navistar A26 12.42L Diesel Engine with VGT, EGR, and CAC.

Deployment

Once the optimal ANN is determined, the trained intelligent engine intake MAF prediction or estimation system of the Intelligent MAF Prediction System with Neural Network 10 of the present disclosure can be deployed into the controller of an engine, for non-limiting example into an ECU or an ECM, for in-vehicle testing as a Simulink® Block. Simulink® is a MATLAB®-based graphical programming environment for modeling, simulating, and analyzing multi-domain dynamic systems. Its primary interface is a graphical block diagramming tool and a customizable set of block libraries. It integrates with the MATLAB® environment and can either drive MATLAB® or be scripted from it. Simulink® is used in automatic control and digital signal processing for multi-domain simulation and model-based design.[22] Simulink® and MATLAB® are available from MathWorks® located at 1 Apple Hill Drive Natick, MA 01760. A Simulink® block of the intelligent engine intake MAF prediction system may thereby be created.

Figure 8:
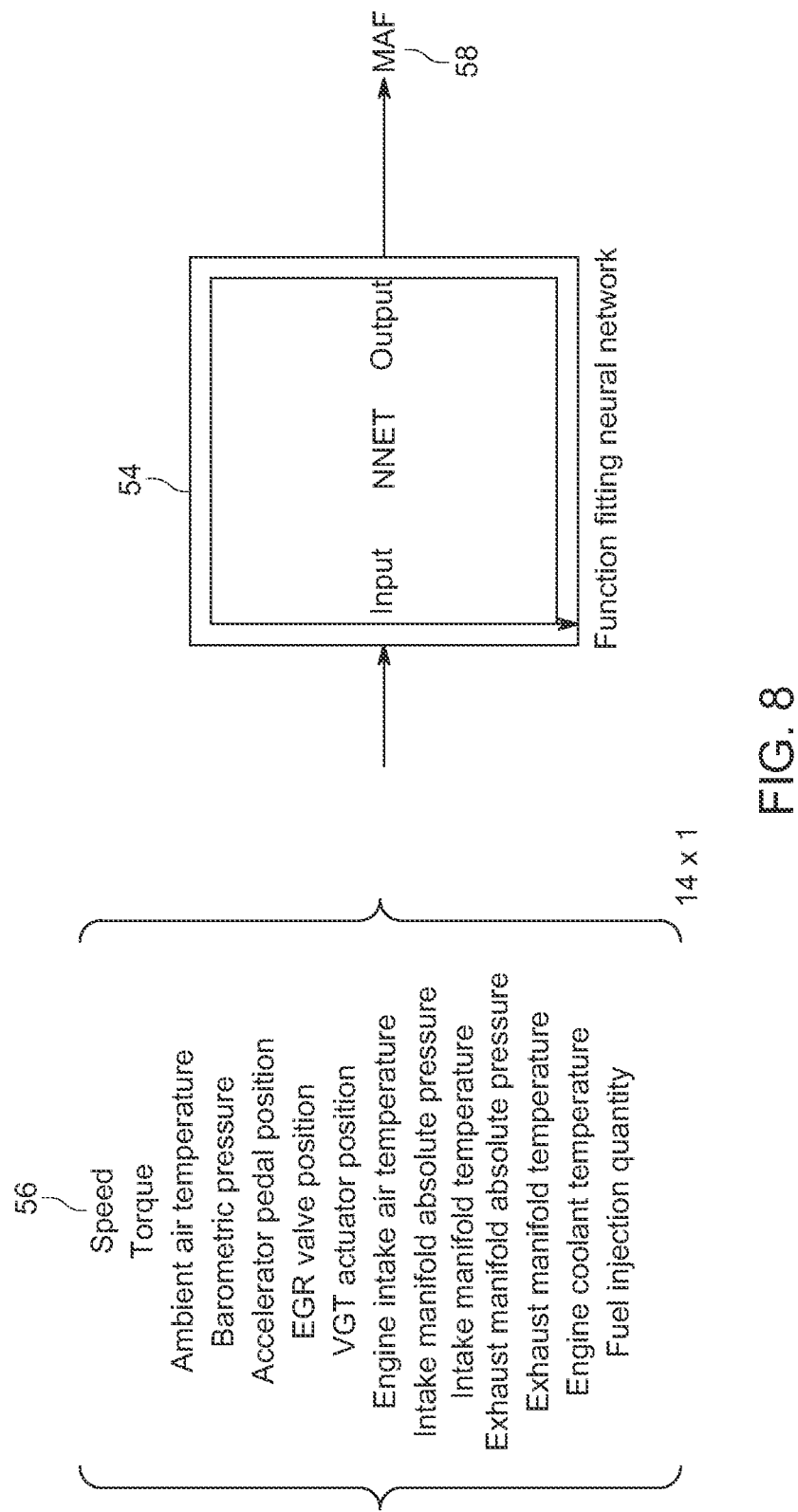
FIG. 8 is a graphic representation of a generated Simulink® Block of an embodiment of the Intelligent MAF Prediction System with Neural Network of the present disclosure, as described herein.
Figure 9:
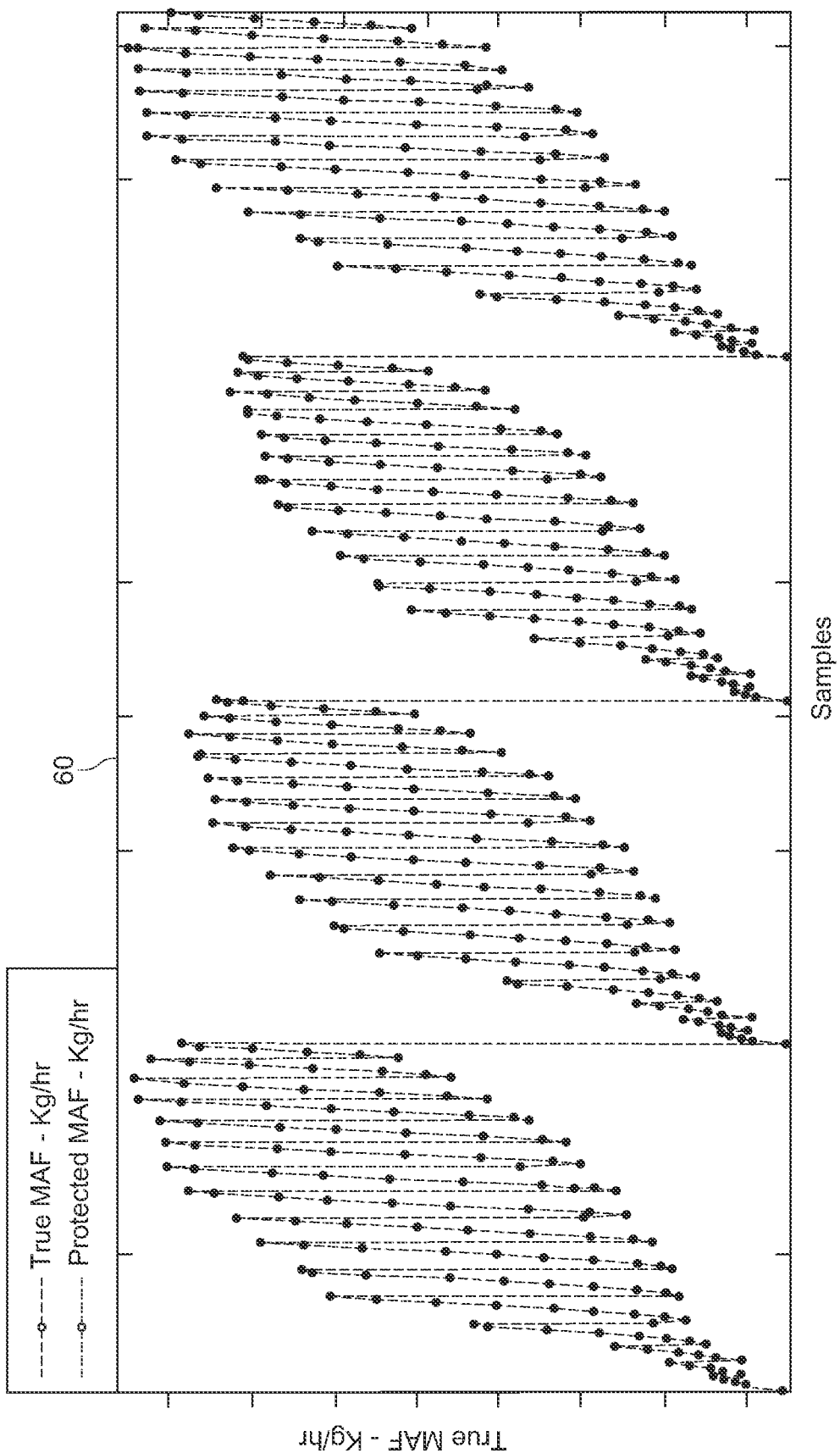
FIG. 9 is a graph showing a Simulink® output of an embodiment of the Intelligent MAF Prediction System with Neural Network of the present disclosure, as described herein.

[22] Simulink. 12 Nov. 2020. Retrieved 2 Dec. 2020. https://en.wikipedia.org/wiki/Simulink The generated Simulink® Block of the intelligent engine intake MAF prediction or estimation system is shown in FIG. 8. The inputs 56 and the output 58 of the ANN are again in normalized form. The Simulink® block reads signals from various sensors fed to it by way of the engine controller, which may again be for non-limiting example an ECU or ECM. This Simulink® block may be integrated with the engine controller using a Rapid Prototyping System such as dSpace, available from dSPACE Inc., 50131 Pontiac Trail, Wixom, MI, USA 48393, and can be tested online. The Simulink® output from the intelligent engine intake MAE prediction or estimation system of the Intelligent MAF Prediction System with Neural Network 10 of the present disclosure is shown in FIG. 9. The next step may include generating software code in an AUTOSAR code generation environment and flashing it to the engine controller, AUTomotive Open System ARchitecture (AUTOSAR) is a global development partnership of automotive interested parties that creates and establishes an open and standardized software architecture for ECUs and/or ECMs.[23]

[23] AUTOSAR, 27 Oct. 2020, Retrieved 2 Dec. 2020. https://en.wikipedia.org/wiki/AUTOSAR

THE FOLLOWING REFERENCES ARE HEREBY INCORPORATED BY REFERENCE IN THEIR ENTIRETY

Cummins Inc., Colombus, IN (2012). US20130131955A1. Ser. No. 13/646,891.

Wu, Bin, Zoran Filipi, Dennis N. Assanis, Denise M. Kramer, Gregory L. Ohl, Michael J. Prucka, and Eugene Divalentin. "Using Artificial Neural Networks for Representing the Air Flow Rate through a 2.4 Liter VVT Engine." SAE Technical Paper Series, Oct. 25, 2004. https.//doi.org/10.4271/2004-01-3054.

Desantes, J. m., J. Galindo, C. Guardiola, and V. Dolz. "Air Mass Flow Estimation in Turbocharged Diesel Engines from in-Cylinder Pressure Measurement," Experimental Thermal and Fluid Science 34, no. 1 (2010): 37-47. https.//doi.org/10.1016/i expthermflusci 2009.08 009.

Barbarisi, Osvaldo, di Gaeta, Alessandro & Glielmo, Luigi & Santini, Stefania. "An Extended Kalman Observer for the In-Cylinder Air Mass Flow Estimation." 2002.

Polói, Tomáš, and Rohal'-Ilkiv, Boris," Mass Flow Estimation with Model Bias Correction for a Turbocharged Diesel Engine." Control Engineering Practice, 2013, 23(1):22-31

Deng, Jiamei, Stobart, Richard, and Maass Basti. "The Applications of Artificial Neural Networks to Engines." Artificial Neural Networks—Industrial and Control Engineering Applications, April 2011. https://doi.org/10.5772/15783.

Uzun, Abdullah. "Air Mass Flow Estimation of Diesel Engines Using Neural Network." Fuel 117 (2014): 833-38. https://doi.org/10.1016/j.fuel 2013.09.078.

Oh, Byounggul, Minkwang Lee, Yeongseop Park, Jongseob Won, and Myoungho Sunwoo. "Mass Air Flow Control of Common-Rail Diesel Engines Using an Artificial Neural Network." Proceedings of the Institution of Mechanical Engineers, Part D: Journal of Automobile Engineering 227, no. 3 (April 2012): 299-310. https://doi.org/10.1177/095440701245797.

Taglialatela-Scafati, Ferdinando, Cesario, Nicola and Cassese, Pasquale. "Method and device for estimating the inlet air flow in a combustion chamber of a cylinder of an internal combustion engine" EP1705353B1, August, 2012.

Kerkeni, H., J. Lauber, and I. M. Guerra. "Estimation of Individual in-Cylinder Air Mass Flow via. Periodic Observer in Takagi-Sugeno Form." 2010 IEEE Vehicle Power and Propulsion Conference, 2010. https://doi.org/10.1109/vppc.2010.5729154.

Höckerdal, Erik, Lars Eriksson, and Erik Frisk. "Air Mass-Flow Measurement and Estimation in Diesel Engines Equipped with GR and VGT." SAE International Journal of Passenger Cars—Electronic and Electrical Systems 1, no. 1 (2008): 393-402. https://doi.org/10.4271/2008-01-0992.

While the Intelligent MAF Prediction System with Neural Network has been described with respect to at least one embodiment, the Intelligent MAF Prediction System with Neural Network can be further modified within the spirit and scope of this disclosure, as demonstrated previously. This application is therefore intended to cover any variations, uses, or adaptations of the Intelligent MAF Prediction System with Neural Network using its general principles. Further, this application is intended to cover such departures from the present disclosure as come within known or customary practice in the art to which the disclosure pertains and which fall within the limits of the appended claims.

What is claimed is:

1. An Arrangement for Estimating or Predicting Mass Air Flow (MAF) Sensor Information,
comprising:
an engine having an engine controller and an engine intake MAF sensor;
an intelligent engine intake MAF prediction or estimation system configured to provide an engine intake MAF output variable;
the intelligent engine intake MAF prediction or estimation system comprising an Artificial Neural Network (ANN) deployed into the engine controller and having an ANN architecture selected from multiple candidate ANN architectures, each of the multiple candidate ANN architectures being trained using a training set of data, the selected ANN architecture being selected by way of an automated ANN architecture selection algorithm using a testing set of data;
the training set of data and the testing set of data comprising at least one input variable from at least one of an engine sensor and an actuator that affects or is affected by engine intake MAF;
the training set of data and the testing set of data being acquired from testing a target engine and pre-processing a body of data acquired therefrom, the pre-processing comprising splitting the body of data into the training set of data and the testing set of data;
the pre-processing further comprising normalizing the data;
the automated ANN architecture selection algorithm being triggered after pre-processing the body of data;
the automated ANN architecture selection algorithm generating all possible combinations of ANNs from a number of hidden layers and hidden neurons;
the automated ANN architecture selection algorithm training each of the possible combinations of ANNs by way of a Levenberg-Marquardt algorithm; and
the automated ANN architecture selection algorithm selecting the optimal ANN architecture based on Root Mean Squared Error (RMSE) analysis using the testing set of data.

2. The Arrangement of claim 1, wherein:
the engine controller being configured to use the engine intake MAF output variable:
instead of a signal provided by the engine intake MAF sensor,
in conjunction with the signal provided by the engine intake MAF sensor, or
selectively instead of and in conjunction with the signal provided by the engine intake MAF sensor.

3. The Arrangement of claim 1, wherein:
the engine intake MAF sensor operating on the principle of hot wire anemometry.

4. The Arrangement of claim 1, wherein:
the training set of data and the testing set of data further comprising at least one input variable from a dynamometer arrangement, wherein testing the target engine comprises systematically varying engine speed and accelerator pedal position over a normal operating range of the engine, and wherein testing the target engine further comprises varying engine intake air temperature.

5. The Arrangement of claim 4, wherein:
pre-processing the body of data further comprises performing a Pearson correlation test upon at least one of:
the at least one input variable from at least one of the engine sensor and the actuator, and
the at least one input variable from the dynamometer arrangement, and
checking thereby the correlation between each input variable and engine intake MAF.

6. The Arrangement of claim 4, wherein:
the training set of data further comprising a dynamometer bench measurement of engine intake MAF used as a reference point or true value.

7. The Arrangement of claim 4, wherein:
the input variables from at least one of engine sensors and actuators that affect or are affected by engine intake MAF are selected from a group consisting of:
exhaust manifold absolute pressure,
intake manifold absolute pressure,
quantity of fuel injected,
engine speed,
engine exhaust gas temperature,
engine brake torque,
accelerator pedal position,
VGT actuator position,
EGR valve position,
engine coolant temperature,
barometric pressure,
ambient air temperature, and
engine intake air temperature.

8. The Arrangement of claim 4, wherein:
the automated ANN architecture selection algorithm using a Tangent Sigmoid as a transfer activation function for a hidden layer output.

9. A Method of Estimating or Predicting MAF Sensor Information, comprising the steps of:
providing an engine with an engine controller, and an engine intake Mass Air Flow (MAF) sensor;
training multiple candidate Artificial Neural Network (ANN) architectures using a training set of data;
selecting an ANN architecture from the multiple candidate ANN architectures by way of an automated ANN architecture selection algorithm using a testing set of data;
configuring an intelligent engine intake MAF prediction or estimation system to provide an engine intake MAF output variable using the selected ANN architecture;
deploying the intelligent engine intake MAF prediction or estimation system comprising the selected ANN architecture into the engine controller;
the training set of data and the testing set of data comprising at least one input variable from at least one of an engine sensor and an actuator that affects or is affected by engine intake MAF; and
the training set of data and the testing set of data are acquired by testing a target engine and pre-processing a body of data acquired therefrom, pre-processing the body of data comprising splitting the body of data into the training set of data and the testing set of data;
pre-processing the body of data further comprising normalizing the data;
triggering the automated ANN architecture selection algorithm after pre-processing the body of data;
generating all possible combinations of ANNs from a number of hidden layers and hidden neurons using the automated ANN architecture selection algorithm;
training each of the possible combinations of ANNs by way of a Levenberg-Marquardt algorithm using the automated ANN architecture selection algorithm; and
selecting the optimal ANN architecture based on Root Mean Squared Error (RMSE) analysis using the automated ANN architecture selection algorithm and the testing set of data.

10. The Method of claim 9, further comprising the steps of:
configuring the engine controller to use the engine intake MAF output variable:
instead of a signal provided by the engine intake MAF sensor,
in conjunction, with the signal provided by the engine intake MAF sensor, or
selectively instead of and in conjunction with the signal provided by the engine intake MAF sensor.

11. The Method of claim 9, wherein:
the engine intake MAF sensor operating on the principle of hot wire anemometry.

12. The Method of claim 9, wherein:
the training set of data and the testing set of data further comprising at least one input variable from a dynamometer arrangement;
testing the target engine comprises systematically varying engine speed and accelerator pedal position over a normal operating range of the engine; and
testing the target engine further comprises varying engine intake air temperature.

13. The Method of claim 12, wherein:
pre-processing the body of data further comprises performing a Pearson correlation test upon the at least one input variable from the at least one of the engine sensor and the actuator, and the at least one input variable from the dynamometer arrangement,
and checking thereby the correlation between each input variable and engine intake MAF.

14. The Method of claim 12, wherein:
the training set of data further comprises a dynamometer bench measurement of engine intake MAF used as a reference point or true value.

15. The Method of claim 12, wherein:
the input variables from at least one of engine sensors and actuators that affect or are affected by engine intake MAF are selected from a group consisting of:
exhaust manifold absolute pressure,
intake manifold absolute pressure,
quantity of fuel injected,
engine speed,
engine exhaust gas temperature,
engine brake torque,
accelerator pedal position,
VGT actuator position,
EGR valve position,
engine coolant temperature,
barometric pressure,
ambient air temperature, and
engine intake air temperature.

16. The Method of claim 12, wherein:
the automated ANN architecture selection algorithm uses a Tangent Sigmoid as a transfer activation function for a hidden layer output.

* * * * *